US012728545B2

(12) United States Patent
Alspach et al.

(10) Patent No.: US 12,728,545 B2
(45) Date of Patent: Sep. 8, 2026

(54) DYNAMICALLY INFLATABLE DEFORMABLE MEMBRANES

(71) Applicant: Toyota Research Institute, Inc., Los Altos, CA (US)

(72) Inventors: Alexander Alspach, Woburn, MA (US); Andrew M. Beaulieu, Somerville, MA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 1019 days.

(21) Appl. No.: 17/862,698

(22) Filed: Jul. 12, 2022

(65) Prior Publication Data

US 2024/0017422 A1 Jan. 18, 2024

(51) Int. Cl.
*B25J 15/00* (2006.01)
*B25J 9/16* (2006.01)

(52) U.S. Cl.
CPC ......... *B25J 15/0023* (2013.01); *B25J 9/1653* (2013.01); *B25J 9/1697* (2013.01)

(58) Field of Classification Search
CPC ...... B25J 15/0023; B25J 15/12; B25J 9/1653; B25J 9/1697; B25J 13/084; B25J 19/023
See application file for complete search history.

(56) References Cited

U.S. PATENT DOCUMENTS

| | | | | |
|---|---|---|---|---|
| 5,245,885 | A * | 9/1993 | Robertson | B25J 15/0023 92/92 |
| 6,484,601 | B1 * | 11/2002 | Arrichiello | B25J 9/14 92/37 |
| 7,258,379 | B2 * | 8/2007 | Ono | B25J 9/142 294/119.3 |
| 10,173,328 | B2 * | 1/2019 | Lessing | F15B 15/103 |
| 10,702,992 | B2 * | 7/2020 | Lessing | B25J 15/12 |
| 10,843,348 | B1 | 11/2020 | Aduh et al. | |
| 10,941,617 | B2 | 3/2021 | Benchikh et al. | |
| 11,090,818 | B2 * | 8/2021 | Curhan | B25J 15/12 |
| 2003/0110938 | A1 * | 6/2003 | Seto | B25J 15/12 92/92 |
| 2021/0213626 | A1 | 7/2021 | Heinzmann et al. | |

FOREIGN PATENT DOCUMENTS

| | | | |
|---|---|---|---|
| DE | 102014008665 | A1 | 12/2015 |
| WO | 2020222135 | A1 | 11/2020 |

* cited by examiner

*Primary Examiner* — Stephen A Vu
(74) *Attorney, Agent, or Firm* — Dinsmore & Shohl LLP

(57) ABSTRACT

Embodiments of a deformable gripper are described. The deformable gripper comprises a base, a first inner membrane and a second inner membrane coupled to the base, an outer membrane attached to the base such that the outer membrane is positioned to enclose the first inner membrane and the second inner membrane, and an actuator operable to independently expand and contract the first inner membrane and the second inner membrane such that a portion of an outer surface of the outer membrane expands and contracts responsive to the expansion and contraction of at least one of the first inner membrane and the second inner membrane.

20 Claims, 5 Drawing Sheets

DYNAMICALLY INFLATABLE DEFORMABLE MEMBRANES

TECHNICAL FIELD

The embodiments described herein generally relate to a deformable gripper, and more particularly, to a deformable gripper that includes inner membranes and an outer membrane such that expansion and contraction of at least one of the inner membranes causes an expansion and contraction of the outer membrane.

BACKGROUND

Conventional robots may include a plurality of arms, appendages, and so forth, upon which one or more deformable membranes may be positioned. Conventionally, these deformable membranes may have deformable components disposed upon various parts of these membranes. It is noted that, conventionally, these deformable components inflate and deflate uniformly across respective surfaces areas of these components. In other words, contours of these deformable components are not variably inflatable. As such, the capability of the deformable components to maintain contact with external objects of various shapes and sizes is limited.

Accordingly, a need exists for deformable membranes with components whose inflation levels may be dynamically varied.

SUMMARY

In one embodiment, a deformable gripper is described. The deformable gripper comprises a base, a first inner membrane and a second inner membrane coupled to the base, an outer membrane attached to the base such that the outer membrane is positioned to enclose the first inner membrane and the second inner membrane, and an actuator operable to independently expand and contract the first inner membrane and the second inner membrane such that a portion of an outer surface of the outer membrane expands and contracts responsive to the expansion and contraction of at least one of the first inner membrane and the second inner membrane.

In another embodiment, a deformable gripper is described. The deformable gripper comprises a base, a camera, a first inner membrane and a second inner membrane coupled to the base, an outer membrane attached to the base such that the outer membrane is positioned to the first inner membrane and the second inner membrane, and an actuator operable to independently expand and contract the first inner membrane and the second inner membrane such that a portion of an outer surface of the outer membrane expands and contracts responsive to the expansion and contraction of at least one of the first inner membrane and the second inner membrane, wherein the expansion of the portion of the outer membrane is based on at least one of the first inner membrane and the second inner membrane contacting an inner surface of the outer membrane that is associated with the portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As stated above, conventional robots may include a plurality of arms, appendages, and so forth, in which one or more deformable membranes may be positioned. The deformable membranes may have deformable components disposed upon various parts of the membranes, e.g., deformable sensors. Additionally, the deformable membranes may only be uniformly inflatable, and as such, the capability of the deformable components to maintain contact with external objects of various shapes and sizes is limited.

A deformable gripper of the present disclosure addresses and overcomes this limitation. The deformable gripper as described in the present disclosure includes an actuator, a controller incorporated therein, and a plurality of inner membranes and an outer membrane positioned on a base of the gripper. In operation, the deformable gripper may expand or contract a particular membrane in a manner that is independent of the other membranes, and in this way, may control the expansion and contraction of the deformable gripper in a non-uniform or dynamic manner. For example, the deformable gripper may operate to expand or contract a first inner membrane independent of a second inner membrane, and further operate to expand or contract an outer membrane independent of the first inner membrane or the second inner membrane. The deformable gripper may also operate to expand or contract the second inner membrane independent of the first inner membrane or the outer membrane. Such operation enables the deformable gripper to maintain stronger and more consistent contact with objects that are external to the deformable gripper. Deformability may refer, e.g., to ease of deformation of deformable portions of the deformable membrane. Deformability may also refer to how easily a portion of the deformable gripper contracts when contacting an external object. It is further noted that the deformable gripper may include deformable sensors that are positioned within a deformable gripper. The deformable sensor may be a camera or comparable sensor that is capable of high spatial resolution. The deformable sensor may also be a Time-of-Flight sensor or a sensor that has substantially the same capabilities and functionalities as the Time-of-Flight sensor. In embodiments, the deformable sensor positioned within a deformable gripper may be a dense tensile sensing sensor that provides the gripper with a fine sense of touch, e.g., comparable to the touch associated with a human's fingers. The deformable sensor may also have a depth resolution for measuring movement towards and away from the sensor. The deformable gripper may include a plurality deformable sensors embedded with various areas within the inner membranes of the gripper.

Figure 1:
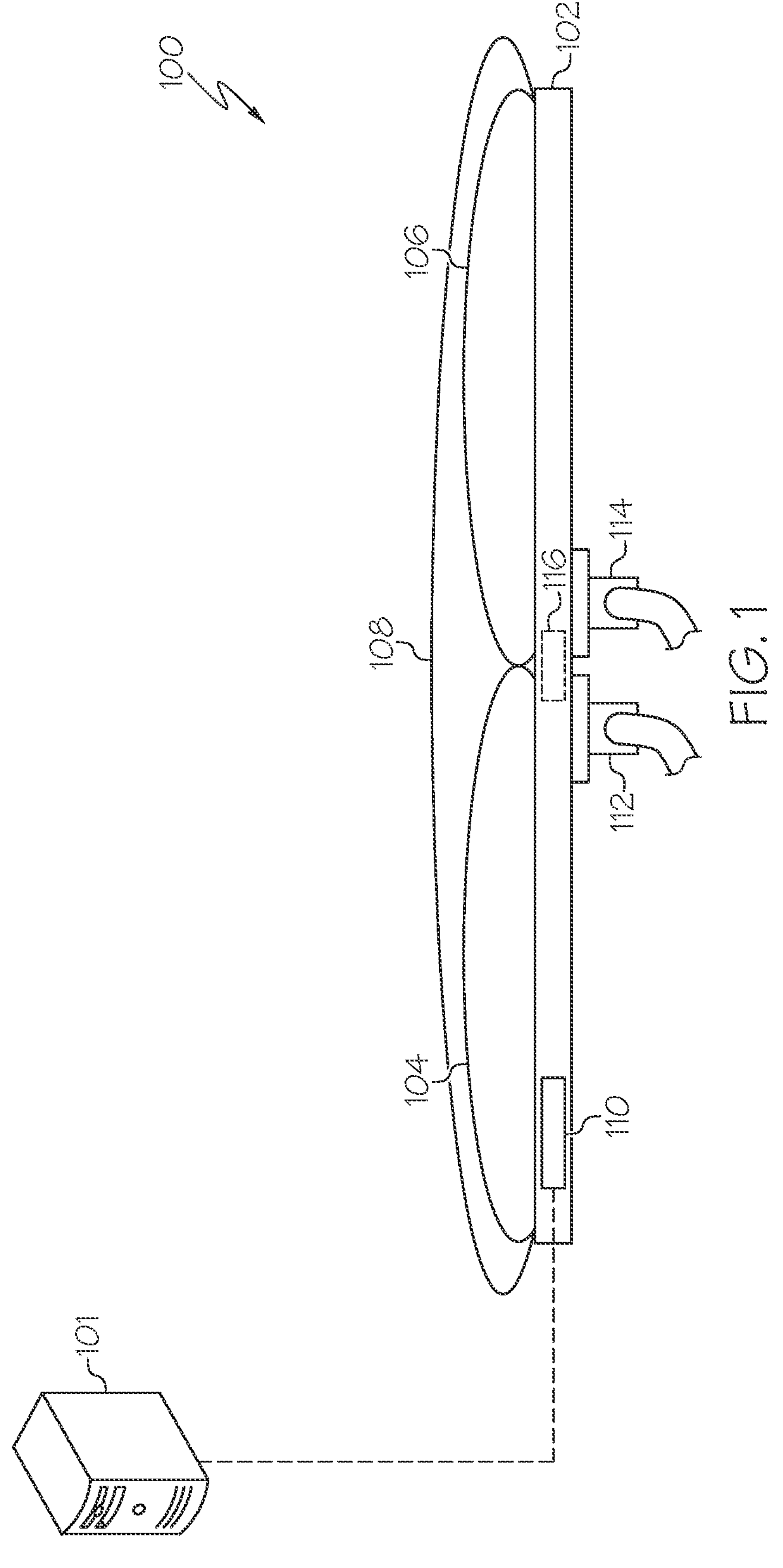
FIG. 1 depicts an example deformable gripper of the present disclosure, according to one or more embodiments described and illustrated herein.

FIG. 1 depicts an example deformable gripper 100 of the present disclosure, according to one or more embodiments described and illustrated herein. In embodiments, the deformable gripper 100 includes a base 102 that includes an actuator 110 and a port 116. The actuator 110 may include a controller 101 that may be configured to control the actuator 110 such that the actuator 110 may be operable to expand and contract a first inner membrane 104 and a second inner membrane 106. The first inner membrane 104 and the second inner membrane 106 may be detachably adhered or permanently coupled or adhered to a surface of the base 102. In embodiments, an outer membrane 108 may also be detachably or permanently coupled with a surface of the base 102 such that the outer membrane 108 encloses each of the first inner membrane 104 and the second inner membrane 106.

In embodiments, one or more image capturing devices (e.g., cameras) may be embedded on a surface of the base 102, and these image capturing devices may capture one or more images, in real time, of one or more objects contacting a portion of the outer surface of the outer membrane 108. In embodiments, a plurality of image capturing devices may be positioned on various parts of the base 102. For example, a camera may be positioned on the base 102 and enclosed by the first inner membrane 104 and the outer membrane 108. In another embodiment, a camera may be positioned on the base 102 and enclosed by the second inner membrane 106 and the outer membrane 108. In yet another embodiment, cameras may be positioned such that the cameras are enclosed by the first inner membrane 104, the second inner membrane 106, and the outer membrane 108, respectively. In embodiments, time-of-flight sensors may also be embedded or positioned on the base 102 such that these sensors are also enclosed by the first inner membrane 104, the second inner membrane 106, and the outer membrane 108.

In embodiments, the base 102 may be formed of acrylic or other comparable materials such as, e.g., plexiglass, polypropylene, polycarbonate, and so forth, while the first inner membrane 104, the second inner membrane 106, and the outer membrane 108 may be comprised of latex. In embodiments, the surface of each of the first inner membrane 104, the second inner membrane 106, and the outer membrane 108 may be embedded with a pattern, e.g., a dot pattern or configuration. In embodiments, the example deformable gripper 100 may utilize the one or more image capturing devices to capture one or more images of one or more external objects that contact one or more areas on the outer surface of the outer membrane 108. The shape and extent of deformation indicated in the images and the manner in which the patterns embedded on the first inner membrane 104, the second inner membrane 106, and/or the outer membrane 108 is temporarily altered, e.g., as a result of contact with the one or more external objects, may be analyzed by the controller 101. In particular, the analysis may be utilized by the controller 101 to determine the geometric shape of these external objects, a position or orientation of these external objects relative to the deformable gripper 100, and so forth.

In embodiments, the actuator 110 may be operable to expand and contract the first inner membrane 104 independent of the second inner membrane 106 and may be further operable to expand and contract the second inner membrane 106 independent of the first inner membrane. In embodiments, the actuator 110 may be controlled by the controller 101 such that the actuator 110 is operable to simultaneously expand or contract both the first inner membrane 104 and the second inner membrane 106. In embodiments, the actuator 110 may be controlled by the controller 101 such that the actuator 110 is operable to simultaneously expand or contract the first inner membrane 104, the second inner membrane 106, and the outer membrane 108. In embodiments, the actuator 110 may be controlled by the controller 101 such that the actuator 110 is operable to expand or contract the outer membrane 108 independent of and without affecting the positions of the first inner membrane 104 and the second inner membrane 106. It is noted that, in operation, any expansion of the first inner membrane 104 and/or the second inner membrane 106 above a particular threshold will result respective outer portions of the first inner membrane 104 and the second inner membrane 106 contacting respective inner portions of the outer membrane 108. Consequently, the outer membrane 108 may expand as a result of the expansion of the first inner membrane 104 and/or the second inner membrane 106.

In embodiments, wires may be connected to connections 112 and 114 that may be installed on a bottom surface of the base 102. In embodiments, these connections may be part of a larger autonomous robot or robotic system (not shown). For example, the example deformable gripper 100 may be positioned on the arms, legs, torso, and so forth, of an autonomous robot that is designed and configured to interact with one or more objects that are external to the example deformable gripper 100. In embodiments, the wires may transfer a particular magnitude of air, via the connections 112 and 114, and the port 116, to one or more of the first inner membrane 104, the second inner membrane 106, and/or the outer membrane 108.

In embodiments, various components (e.g., the base 102) of the deformable gripper 100 may be formed of, e.g., carbon-filled nylon, a composite of Oxny material and embedded continuous fiberglass, and other comparable material. In other embodiments, the base 102 may be 3D printed and mechanically and detachably coupled to linking members that are associated with part of, e.g., an autonomous robot (not shown). The mechanical coupling may be based on brass heat-set inserts. Other comparable adhering or mechanical coupling components are also contemplated.

Figure 2:
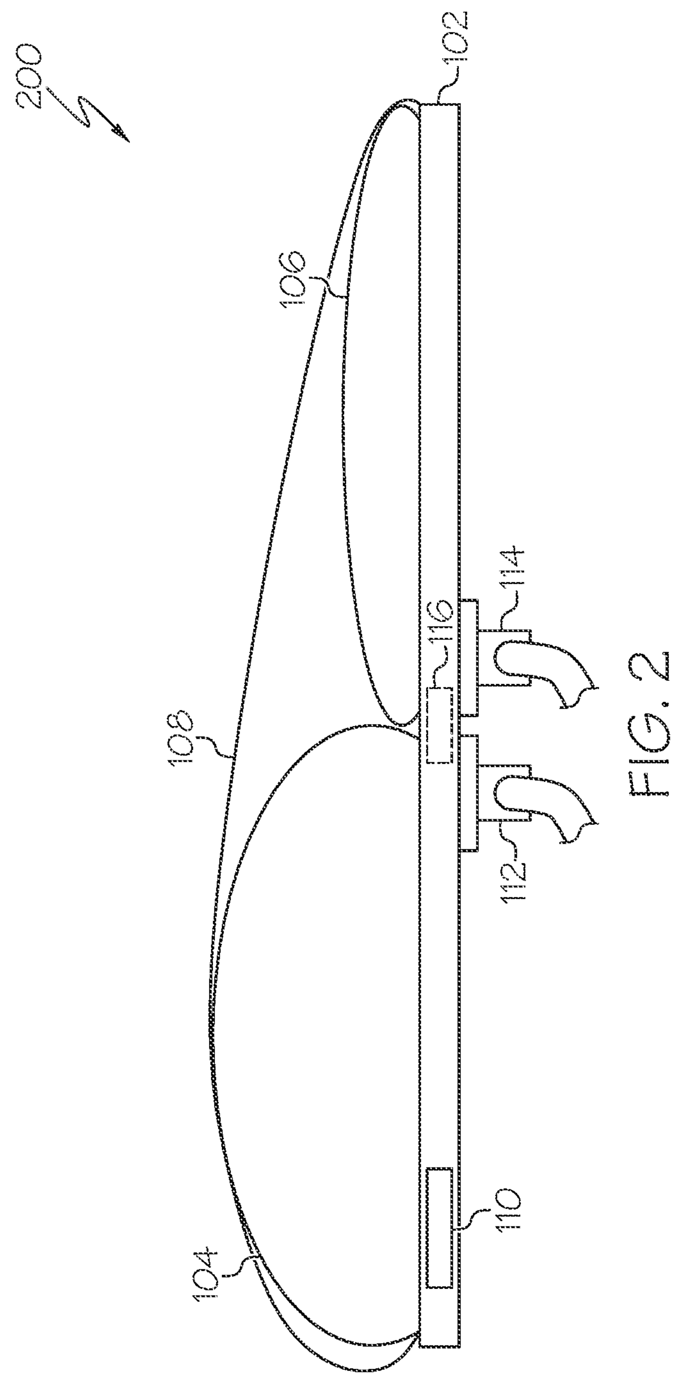
FIG. 2 schematically depicts an example configuration of the example deformable gripper of the present disclosure in which the first deformable member expands by a particular magnitude in a manner that is independent of the second inner membrane, according to one or more embodiments described and illustrated herein.

FIG. 2 schematically depicts an example configuration 200 of the example deformable gripper 100 of the present disclosure in which the first inner membrane 104 expands by a particular magnitude in a manner that is independent of the second inner membrane 106, according to one or more embodiments described and illustrated herein. As illustrated, the controller 101 may generate an instruction or receive an instruction (from one or more computing devices that are external to the deformable gripper 100), responsive to which the controller 101 may operate to instruct the actuator 110 to expand the first inner membrane 104 by a particular magnitude. For example, in embodiments, the instructions may include expanding a particular membrane for a predefined time frame, expanding a particular membrane for a particular magnitude, and so forth. As previously stated, a particular magnitude of air may be transferred into any of, a subset of, or all of the membranes of the example deformable gripper 100 in order to expand one or more of these membranes.

Figure 3:
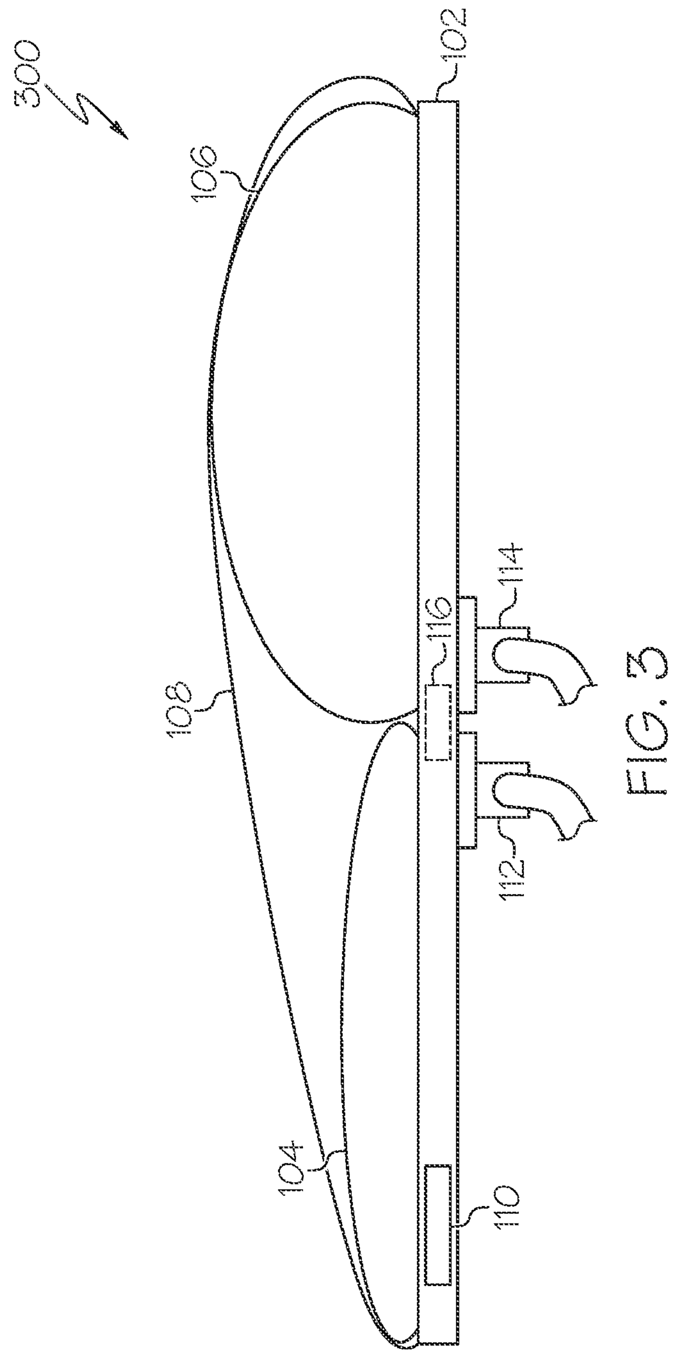
FIG. 3 depicts an example configuration of the example deformable gripper of the present disclosure in which the second inner membrane expands by a particular magnitude in a manner that is independent of the first inner membrane, according to one or more embodiments described and illustrated herein.

The instruction executed by the controller 101 may result in the actuator 110 operating to expand the first inner membrane 104 by a particular magnitude such as 2 inches, 3 inches, 5 inches, and so forth, as non-limiting examples. As illustrated, such an expansion of the first inner membrane 104, may result an outer surface of the first inner membrane 104 contacting a portion of the inner surface of the outer membrane 108, causing a resultant increase in the size of the outer membrane 108, as illustrated in FIG. 3. It is noted that, in the example illustrated in FIG. 2, the expansion of the first inner membrane 104 is independent of the second inner membrane 106.

In embodiments, it is noted that controller 101 may control the actuator 110 such that the actuator 110 may operate to extract a particular magnitude of air from the first inner membrane 104, resulting in a contraction of the size of the first inner membrane 104. The controller 101 may remove air from the first inner membrane 104 that is expanded, in a calibrated manner, and may do so automatically and without user intervention, e.g., based on requiring the first inner membrane 104 to satisfy a particular firmness threshold, size threshold, and so forth. In embodiments, the threshold may be a combination of the firmness threshold and size threshold as well. In embodiments, the extraction of air may be specific to the first inner membrane 104.

FIG. 3 depicts an example configuration 300 of the example deformable gripper 100 of the present disclosure in which the second inner membrane 106 expands by a particular magnitude in a manner that is independent of the first inner membrane 104, according to one or more embodiments described and illustrated herein. In embodiments, the controller 101 may generate or receive an instruction (from one or more computing devices that are external to the deformable gripper 100), responsive to which the controller 101 may operate to instruct the actuator 110 to expand the second inner membrane 106 by a particular magnitude. In particular, the instruction executed by the controller 101 may result in the actuator 110 operating to expand the second inner membrane 106 by a particular magnitude such as 2 inches, 3 inches, 5 inches, and so forth, as non-limiting examples. Such an expansion of the second inner membrane 106 may result in an outer surface of the second inner membrane 106 contacting a portion of the inner surface of the outer membrane 108, causing a resultant increase in the size of the outer membrane 108, as illustrated in FIG. 3.

In embodiments, similar to the operation of the first inner membrane 104 as described in FIG. 2, the controller 101 may control the actuator 110 such that the actuator 110 may operate to extract a particular magnitude of air from the second inner membrane 106, resulting in a contraction of the second inner membrane 106. The controller 101 may remove air from the second inner membrane 106 that is expanded, in a calibrated manner, and may do so automatically and without user intervention, e.g., based on requiring the first inner membrane to satisfy a particular firmness threshold, size threshold, and so forth. The extraction of air may be specific to the second inner membrane 106.

Figure 4:
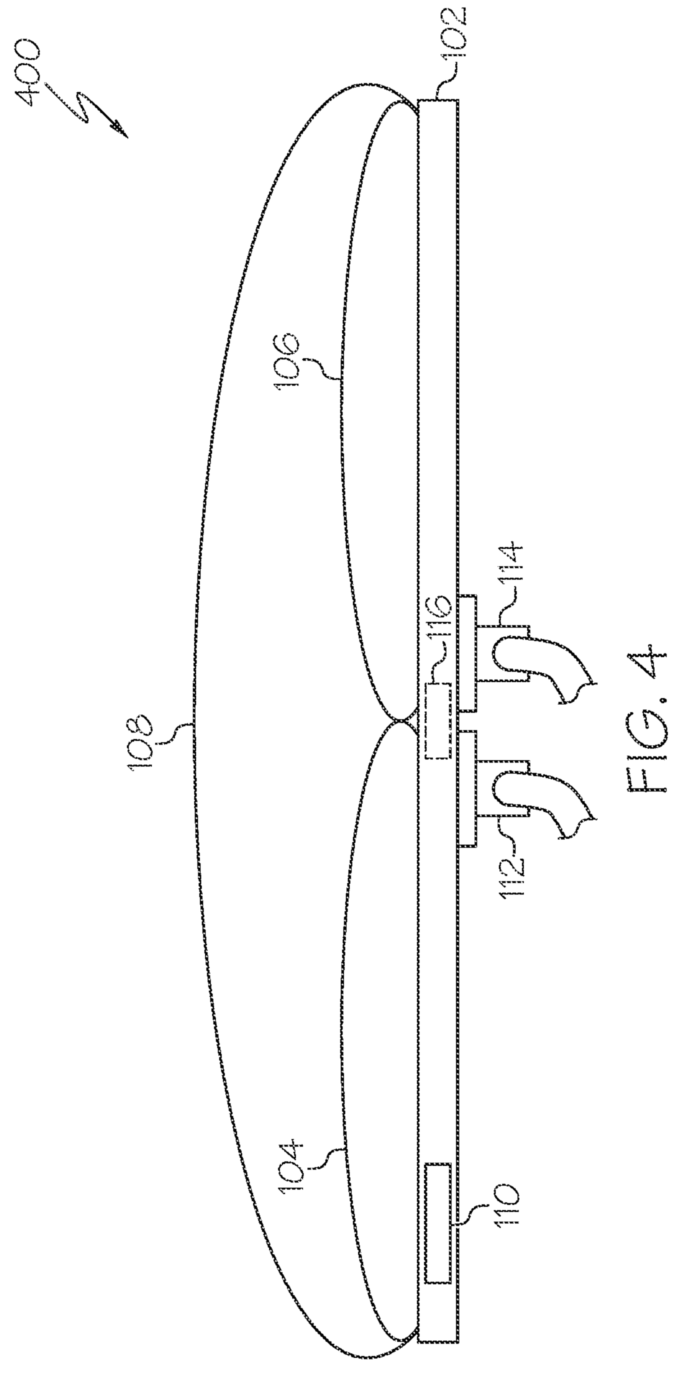
FIG. 4 depicts an example configuration of the example deformable gripper of the present disclosure in which the outer membrane expands by a particular magnitude in a manner that is independent of the first inner membrane and the second inner membrane, according to one or more embodiments described and illustrated herein.

FIG. 4 depicts an example configuration 400 of the example deformable gripper 100 of the present disclosure in which the outer membrane 108 expands by a particular magnitude in a manner that is independent of the first inner membrane 104 and the second inner membrane 106, according to one or more embodiments described and illustrated herein.

The controller 101 may generate an instruction or receive an instruction (from one or more computing devices that are external to the deformable gripper 100), responsive to which the controller 101 may operate to instruct the actuator 110 to expand the outer membrane 108 by a particular magnitude. In particular, as illustrated in FIG. 4, a particular magnitude of air may be transferred into the outer membrane 108 via the connections 112 and 114 and the port 116 such that the outer membrane 108 may expand by, e.g., 2 inches, 3 inches, 5, inches, and so forth (non-limiting examples). It is noted that, in the example configuration 400 illustrated in FIG. 2, the expansion of the outer membrane 108 is independent of the first inner membrane 104 and the second inner membrane 106.

In embodiments, similar to the operation of the first inner membrane 104 and the second inner membrane 106 as described in FIGS. 2 and 3, the controller 101 may control the actuator 110 such that the actuator 110 may operate to extract a particular magnitude of air from the outer membrane 108, resulting in a contraction of the outer membrane 108. The controller 101 may remove air from the outer membrane 108 that is expanded, in a calibrated manner, and may do so automatically and without user intervention, e.g., based on requiring the outer membrane 108 to satisfy a particular firmness threshold, size threshold, and so forth. The extraction of air may be specific to the outer membrane 108.

Figure 5:
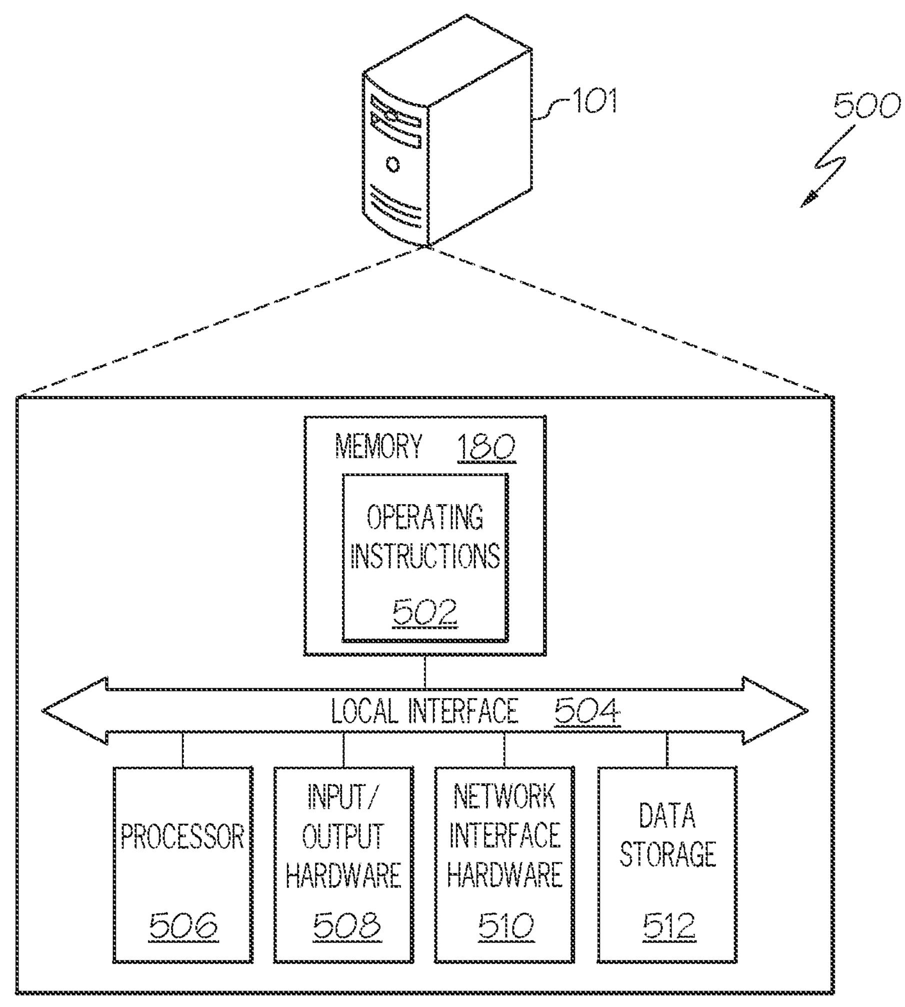
FIG. 5 depicts a non-limiting example of a controller that is configured to perform one or more of the features and functionalities described in the present disclosure, according to one or more embodiments described and illustrated herein.

FIG. 5 depicts a non-limiting example of the controller 101 that is configured to perform one or more of the features and functionalities described in the present disclosure, according to one or more embodiments described and illustrated herein. As illustrated, the controller 101 includes a processor 506, input/output hardware 508, a network interface hardware 510, a data storage component 512, and memory 180. The memory 180 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable media may reside within the computing device and/or a device that is external to the controller 101.

The memory 180 may store operating instructions 502, each of which may be embodied as a computer program, firmware, and so forth. The memory 180 may comprise RAM, ROM, flash memories, hard drives, or any device capable of storing the operating instructions 502 such that the operating instructions 502 can be accessed by the processor 506. The operating instructions 502 may comprise logic or algorithm(s) written in any programming language of any generation (e.g., 1GL, 2GL, 3GL, 4GL, or 5GL) such as, for example, machine language that may be directly executed by the controller 101, or assembly language, object-oriented programming (OOP), scripting languages, microcode, etc., that may be compiled or assembled into machine readable and executable instructions and stored on the memory 180. Alternatively, the operating instructions 502 may be written in a hardware description language (HDL), such as logic implemented via either a field-programmable gate array (FPGA) configuration or an application-specific integrated circuit (ASIC), or their equivalents.

Accordingly, the methods described herein may be implemented in any conventional computer programming language, as pre-programmed hardware elements, or as a combination of hardware and software components. The processor 506 along with the memory 180 may operate as a controller for the controller 101.

A local interface 504 is also included in FIG. 1 and may be implemented as a bus or other communication interface to facilitate communication among the components of the controller 101. The processor 506 may include any processing component operable to receive and execute operating instructions 502 from the memory 180 (such as from a data storage component 512 and/or the memory 180). Accordingly, the processor 506 may be an integrated circuit, a microchip, a computer, or any other computing device. As described above, the input/output hardware 508 may include and/or be configured to interface with speakers, microphones, and/or other input/output components.

The operating instructions 502 may include an operating system and/or other software for managing components of the controller 101. In some embodiments, one or more of the components may reside external to the controller 101 or within other devices. It should be understood that, while the controller 101 is illustrated as a single device, this is also merely an example. As an example, one or more of the functionalities and/or components described herein may be provided by the controller 101. Depending on the particular embodiments, any of these devices may have similar components as those depicted in FIG. 1. To this end, any of these devices may include instructions for performing the functionality described herein.

It should now be understood that the embodiments of the present disclosure are directed to a deformable gripper. The deformable gripper comprises a base, a first inner membrane and a second inner membrane coupled to the base, an outer membrane attached to the base such that the outer membrane is positioned to enclose the first inner membrane and the second inner membrane, and an actuator operable to independently expand and contract the first inner membrane and the second inner membrane such that a portion of an outer surface of the outer membrane expands and contracts responsive to the expansion and contraction of at least one of the first inner membrane and the second inner membrane. In another embodiment, the deformable gripper comprises a base, a camera, a first inner membrane and a second inner membrane coupled to the base, an outer membrane attached to the base such that the outer membrane is positioned to the first inner membrane and the second inner membrane, and an actuator operable to independently expand and contract the first inner membrane and the second inner membrane such that a portion of an outer surface of the outer membrane expands and contracts responsive to the expansion and contraction of at least one of the first inner membrane and the second inner membrane, wherein the expansion of the portion of the outer membrane is based on at least one of the first inner membrane and the second inner membrane contacting an inner surface of the outer membrane that is associated with the portion.

In a first aspect, a deformable gripper comprises a base, a first inner membrane and a second inner membrane coupled to the base, an outer membrane attached to the base such that the outer membrane is positioned to enclose the first inner membrane and the second inner membrane, and an actuator operable to independently expand and contract the first inner membrane and the second inner membrane such that a portion of an outer surface of the outer membrane expands and contracts responsive to the expansion and contraction of at least one of the first inner membrane and the second inner membrane.

In a second aspect, the deformable gripper of the first aspect, wherein the expansion of the portion of the outer membrane is based on at least one of the first inner membrane and the second inner membrane contacting an inner surface of the outer membrane that is associated with the portion.

In a third aspect, the deformable gripper of the first aspect or the second aspect, further comprising an additional portion of the outer membrane expanding responsive to an additional instruction from the actuator, the expansion of the additional portion of the outer membrane is independent of the first inner membrane and the second inner membrane.

In a fourth aspect, the deformable gripper of the first to the third aspects, wherein each of the outer membrane and the first inner membrane and the second inner membrane are independently expandable via a port that is disposed in the base.

In a fifth aspect, the deformable gripper of the fourth aspect, wherein the port is shared by the outer membrane and the first inner membrane and the second inner membrane.

In a sixth aspect, the deformable gripper of any of the first to the fifth aspects, wherein the outer membrane includes a pattern embedded thereupon.

In a seventh aspect, the deformable gripper of the sixth aspect, further comprising a camera that is configured to capture one or more images of an object contacting the pattern embedded on the outer surface of the outer membrane.

In an eighth aspect, the deformable gripper of the seventh aspect, wherein the camera is positioned on the base and enclosed by the first inner membrane.

In a ninth aspect, the deformable gripper of the eighth aspect, wherein the camera is positioned on the base and enclosed by the second inner membrane.

In a tenth aspect, the deformable gripper of the eighth aspect, wherein the camera is positioned on the base and enclosed by the outer membrane.

In an eleventh aspect, the deformable gripper of the eight aspect, further comprising a processor that is configured to determine a shape of the object based on the object contacting the pattern.

In a twelfth aspect, a deformable gripper comprises a base, a camera, a first inner membrane and a second inner membrane coupled to the base, an outer membrane attached to the base such that the outer membrane is positioned to the first inner membrane and the second inner membrane, and an actuator operable to independently expand and contract the first inner membrane and the second inner membrane such that a portion of an outer surface of the outer membrane expands and contracts responsive to the expansion and contraction of at least one of the first inner membrane and the second inner membrane, wherein the expansion of the portion of the outer membrane is based on at least one of the first inner membrane and the second inner membrane contacting an inner surface of the outer membrane that is associated with the portion.

In a thirteenth aspect, the deformable gripper of the twelfth aspect, wherein an additional portion of the outer membrane is operable to expand responsive to an additional instruction from the actuator, the expansion of the additional portion of the outer membrane is independent of the first inner membrane and the second inner membrane.

In a fourteenth aspect, the deformable gripper of the twelfth aspect or the thirteenth aspect, wherein each of the outer membrane and the first inner membrane and the second inner membrane are independently expandable via a port.

In a fifteenth aspect, the deformable gripper of the fourteenth aspect, wherein the port is shared by the outer membrane and the first inner membrane and the second inner membrane.

In a sixteenth aspect, the deformable gripper of any of the twelfth to the fifteenth aspects, wherein the camera is configured to capture one or more images of an object contacting a pattern embedded on the outer surface of the outer membrane.

In a seventeenth aspect, the deformable gripper of the sixteenth aspect, further comprising a processor that is configured to determine a shape of the object based on the object contacting the pattern.

In an eighteenth aspect, the deformable gripper of any of the thirteenth to the seventeenth aspects, wherein the camera is positioned on the base and enclosed by the first inner membrane.

In a nineteenth aspect, the deformable gripper of any of the thirteenth to the eighteenth aspects, wherein the camera is positioned on the base and enclosed by the second inner membrane.

In a twentieth aspect, the deformable gripper of any of the thirteenth to the nineteenth aspects, wherein the camera is positioned on the base and enclosed by the outer membrane.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A deformable gripper comprising:

a base;

a first inner membrane and a second inner membrane coupled to the base;

an outer membrane attached to the base such that the outer membrane is positioned to enclose the first inner membrane and the second inner membrane; and an actuator operable to independently expand and contract the first inner membrane and the second inner membrane such that a portion of an outer surface of the outer membrane expands and contracts responsive to an expansion and contraction of at least one of the first inner membrane and the second inner membrane;

wherein the first inner membrane and the second inner membrane are adjacent to one another in a plane parallel to the base.

2. The deformable gripper of claim 1, wherein an expansion of the portion of the outer membrane is based on at least one of the first inner membrane and the second inner membrane contacting an inner surface of the outer membrane that is associated with the portion.

3. The deformable gripper of claim 1, further comprising an additional portion of the outer membrane expanding responsive to an additional instruction from the actuator, an expansion of the additional portion of the outer membrane is independent of the first inner membrane and the second inner membrane.

4. The deformable gripper of claim 1, wherein each of the outer membrane and the first inner membrane and the second inner membrane are independently expandable via a port that is disposed in the base.

5. The deformable gripper of claim 4, wherein the port is shared by the outer membrane and the first inner membrane and the second inner membrane.

6. The deformable gripper of claim 1, wherein the outer membrane includes a pattern embedded thereupon.

7. The deformable gripper of claim 6, further comprising a camera that is configured to capture one or more images of an object contacting the pattern embedded on the outer surface of the outer membrane.

8. The deformable gripper of claim 7, wherein the camera is positioned on the base and enclosed by the first inner membrane.

9. The deformable gripper of claim 8, wherein the camera is positioned on the base and enclosed by the second inner membrane.

10. The deformable gripper of claim 8, wherein the camera is positioned on the base and enclosed by the outer membrane.

11. The deformable gripper of claim 8, further comprising a processor that is configured to determine a shape of the object based on the object contacting the pattern.

12. A deformable gripper comprising:

a base;

a camera;

a first inner membrane and a second inner membrane coupled to the base;

an outer membrane attached to the base such that the outer membrane is positioned to enclose the first inner membrane and the second inner membrane; and an actuator operable to independently expand and contract the first inner membrane and the second inner membrane such that a portion of an outer surface of the outer membrane expands and contracts responsive to an expansion and contraction of at least one of the first inner membrane and the second inner membrane, wherein an expansion of the portion of the outer membrane is based on at least one of the first inner membrane and the second inner membrane contacting an inner surface of the outer membrane that is associated with the portion, wherein the first inner membrane and the second inner membrane are adjacent to one another in a plane parallel to the base.

13. The deformable gripper of claim 12, wherein an additional portion of the outer membrane is operable to expand responsive to an additional instruction from the actuator, an expansion of the additional portion of the outer membrane is independent of the first inner membrane and the second inner membrane.

14. The deformable gripper of claim 13, wherein the camera is positioned on the base and enclosed by the first inner membrane.

15. The deformable gripper of claim 13, wherein the camera is positioned on the base and enclosed by the second inner membrane.

16. The deformable gripper of claim 13, wherein the camera is positioned on the base and enclosed by the outer membrane.

17. The deformable gripper of claim 12, wherein each of the outer membrane and the first inner membrane and the second inner membrane are independently expandable via a port.

18. The deformable gripper of claim 17, wherein the port is shared by the outer membrane and the first inner membrane and the second inner membrane.

19. The deformable gripper of claim 12, wherein the camera is configured to capture one or more images of an object contacting a pattern embedded on the outer surface of the outer membrane.

20. The deformable gripper of claim 19, further comprising a processor that is configured to determine a shape of the object based on the object contacting the pattern.

* * * * *